United States Patent
Ohbayashi

(10) Patent No.: US 7,155,596 B2
(45) Date of Patent: Dec. 26, 2006

(54) ELECTRONIC DEVICE AND PLAYBACK CONTROL METHOD THEREFOR

(75) Inventor: Shuji Ohbayashi, Saitama (JP)

(73) Assignee: Sony Corporation, Tokyo (JP)

( * ) Notice: Subject to any disclaimer, the term of this patent is extended or adjusted under 35 U.S.C. 154(b) by 292 days.

(21) Appl. No.: 10/773,478

(22) Filed: Feb. 6, 2004

(65) Prior Publication Data
US 2004/0158670 A1    Aug. 12, 2004

(30) Foreign Application Priority Data
Feb. 7, 2003    (JP)    ............ P2003-030920

(51) Int. Cl.
*G06F 12/02* (2006.01)
*G11B 15/20* (2006.01)

(52) U.S. Cl. ............ 711/209; 711/221; 711/219

(58) Field of Classification Search .......... None
See application file for complete search history.

(56) References Cited

U.S. PATENT DOCUMENTS 6,236,663 B1 *    5/2001    Kawakami ............ 370/470

2001/0016841 A1 *    8/2001    Karasudani ............ 707/1
2002/0124133 A1 *    9/2002    Duruoz ............ 711/112
2005/0069292 A1 *    3/2005    Yokota et al. ............ 386/95
2005/0259542 A1 *    11/2005    Mochizuki et al. ........ 369/53.2

FOREIGN PATENT DOCUMENTS

JP    2000-311104    11/2000

* cited by examiner

*Primary Examiner*—B. James Peikari
(74) *Attorney, Agent, or Firm*—Finnegan, Henderson, Farabow, Garrett & Dunner, L.L.P.

(57) ABSTRACT

There is provided an electronic device including: a storage medium in which content data is divided into units of clusters and stored; a link information table that records the link structure of the clusters in the storage medium; a cluster table that records, of the series of clusters constituting the content data stored on the storage medium, the cluster number of clusters at predetermined intervals; and playback means for reading and playing the content data in units of clusters. In playing the content data in reverse, if the cluster number of a target cluster to be read is not recorded in the cluster table, the cluster number of the target cluster is obtained by tracing the link information table from a cluster, of the clusters recorded in the cluster table, previous to the target cluster, and the cluster indicated by the cluster number thus obtained is read.

2 Claims, 5 Drawing Sheets

FIG. 4A $n = a \times s + b$
$n = 7$
$s = 4$
$a = 1$
$b = 3$
$n' = a \times s = 4$

FILE0001

| INDEX | CLUSTER NUMBER |
|---|---|
| 0 | 002 |
| 4 | 011 |
| 8 | 020 |
| 12 | 032 |
| ... | ... | n = 7 IS SPECIFIED

REFERENCED INDEX 4 (n') THAT IS CLOSEST WHILE BEING EQUAL TO OR LESS THAN 7 IS

FIG. 4B

FAT

| | CLUSTER NUMBER |
|---|---|
| 002 | 003 |
| 003 | 004 |
| 004 | 005 |
| 005 | 011 |
| 006 | 007 |
| 007 | 008 |
| 008 | 009 |
| 009 | 010 |
| 010 | EOF |
| 011 | 012 |
| 012 | 013 |
| 013 | 014 |
| 014 | 020 |
| 015 | 0 |
| 016 | 0 |
| ... | ... |

CLUSTER INDICATED BY INDEX 4

① MOVE FORWARD IN FAT b−1 TIMES (2 TIMES)
② TARGET CLUSTER
SAME

FIG. 4C

FILE0001

| INDEX | CLUSTER NUMBER |
|---|---|
| 0 | 002 |
| 1 | 003 |
| 2 | 004 |
| 3 | 005 |
| 4 | 011 |
| 5 | 012 |
| 6 | 013 |
| 7 | 014 |
| 8 | 020 |
| ... | ... |

FIG. 5A

| FILE NAME | FIRST CLUSTER |
|---|---|
| FILE0001 | 002 |
| FILE0002 | 006 |
| FILE0003 | 030 |
| ... | ... |

FIG. 5B

FAT

| | CLUSTER NUMBER |
|---|---|
| 002 | 003 |
| 003 | 004 |
| 004 | 005 |
| 005 | 011 |
| 006 | 007 |
| 007 | 008 |
| 008 | 009 |
| 009 | 010 |
| 010 | EOF |
| 011 | 012 |
| 012 | 013 |
| 013 | 014 |
| 014 | 020 |
| 015 | 0 |
| 016 | 0 |
| ... | ... |

FIG. 5C

FILE0001

| INDEX | CLUSTER NUMBER |
|---|---|
| 0 | 002 |
| 1 | 003 |
| 2 | 004 |
| 3 | 005 |
| 4 | 011 |
| 5 | 012 |
| 6 | 013 |
| 7 | 014 |
| 8 | 020 |
| ... | ... |

FILE0002

| INDEX | CLUSTER NUMBER |
|---|---|
| 0 | 006 |
| 1 | 007 |
| 2 | 008 |
| 3 | 009 |
| 4 | 010 |

ELECTRONIC DEVICE AND PLAYBACK CONTROL METHOD THEREFOR

CROSS REFERENCE TO RELATED APPLICATIONS

The present document claims priority to Japanese Priority Document JP 2003-030920, filed in the Japanese Patent Office on Feb. 7, 2003, the entire contents of which are incorporated herein by reference to the extent permitted by law.

BACKGROUND OF THE INVENTION

1. Field of the Invention

The present invention relates to an electronic device and a playback control method therefor, and is suitable for application to portable digital audio players that use a flash memory, for example, as a storage medium for digital content.

2. Description of Related Art

In recent years, portable digital audio players that use, for example, a solid-state memory device such as flash memory, and record and read audio data, such as music and other audio, on and from the solid-state memory have been put to practical use (see, for example, Japanese Patent Application Publication No. 2000-311104).

In these portable digital audio players, audio data is stored on a storage medium as files. As a file management method in portable digital audio players, in general, the FAT (File Allocation Table) file system is used. In the FAT file system, a storage medium is divided into smaller regions called clusters, and data is stored in units of such clusters.

In the FAT file system, a file, depending on its size, is stored in a single cluster, or is divided and stored in a plurality of clusters. In the FAT file system, link information, which forms part of a file, is recorded in a table referred to as a FAT.

In other words, as shown in FIG. 5B, a FAT is a table of FAT entries for all clusters within a storage medium, and in each FAT entry is recorded the cluster number of the cluster that follows the present cluster, an EOF (End of File) indicating that the present cluster is the last cluster of a file, or a "0" which indicates that the present cluster is an unused cluster. In addition, in the directory of the storage medium are stored, as shown in FIG. 5A, the file names of the files stored on the storage medium, and the cluster number of the first cluster (head cluster) of each file.

Thus, in the FAT file system, by tracing the FAT entries sequentially beginning with the first cluster indicated in the directory, accessing each cluster constituting a file is made possible.

In a portable digital audio player, for purposes of going back to the beginning of a piece of music, for example, it is required that reverse playback in which music is played back backwards in time (so called REV playback) be made possible. In such a case, clusters constituting a music file are accessed in reverse order from the last cluster.

However, in the FAT file system, as mentioned above, clusters are sequentially accessed from the beginning of a file in accordance with the FAT. Therefore, in order to access clusters in reverse order during REV playback, the cluster previous to the cluster being read has to be found by following the FAT entries in the FAT from the beginning each time. As such, the bigger the file size (that is, the longer the piece of music), the longer the processing time required for reverse access becomes, and there arises a problem where reverse playback becomes slow.

In order to solve this problem, there exists a portable digital player which makes it possible to access previous clusters rapidly by recording, as shown in FIG. 5C, the cluster number of the clusters constituting a file in order (numbers assigned in this order will be referred to as indices) in a table called a cluster chain buffer that exists for each file, and reading cluster numbers by following the indices in reverse order.

SUMMARY OF THE INVENTION

However, the cluster chain buffers must have all cluster numbers of the files stored in the storage medium recorded therein, and therefore, the cluster chain buffers could require as much memory space as the FAT itself. In recent years, along with the reduction in size and price of solid-state memory devices, the storage capacity of portable digital audio players have become larger, leading to a problem where the space required for cluster chain buffers has become larger, and the configuration more complex.

The present invention is devised in view of such circumstances, and attempts to propose an electronic device and a playback control method therefor which are capable of executing rapid reverse playback with a simple structure.

An embodiment related to the present invention may include: a storage medium for dividing and storing content data in units of clusters; a link information table in which a link structure of the clusters in the storage medium is recorded; a cluster table that records, of a series of clusters constituting content data recorded in the storage medium, the cluster number of clusters at predetermined intervals; and playback means for reading and playing back in units of clusters the content data stored in the storage medium.

When the playback means plays back content data in reverse, if the cluster number of the desired cluster to be read is recorded in the cluster table, the cluster indicated by the cluster number of the desired cluster recorded in the cluster table is read from the storage medium. On the other hand, if the cluster number of the desired cluster is not recorded in the cluster table, the cluster number of the desired cluster is obtained by tracing the link information table from, of the clusters recorded in the cluster table, a cluster that is previous to the desired cluster, and the cluster indicated by the obtained cluster number is read from the storage medium.

The cluster table records at predetermined intervals, and when the cluster number of clusters that fall in between is to be obtained, the link information table is traced from, of the clusters recorded in the cluster table, a cluster that is previous to the desired cluster in order to obtain the cluster number of the desired cluster. Thus, the size of the cluster table is reduced, the configuration can be made simpler, and rapid reverse playback can be executed by using the cluster table and the link information table in conjunction.

BRIEF DESCRIPTION OF THE DRAWINGS

FIGS. 4A, 4B and 4C are schematic diagrams illustrating an example of reverse cluster access; and FIGS. 5A, 5B and 5C are schematic diagrams illustrating a directory of a storage medium, a FAT and a conventional cluster chain buffer, respectively.

DESCRIPTION OF THE PREFERRED EMBODIMENTS

An embodiment of the present invention will be described below with reference to the accompanying drawings.

<Configuration of a Portable Digital Player>

Figure 1:
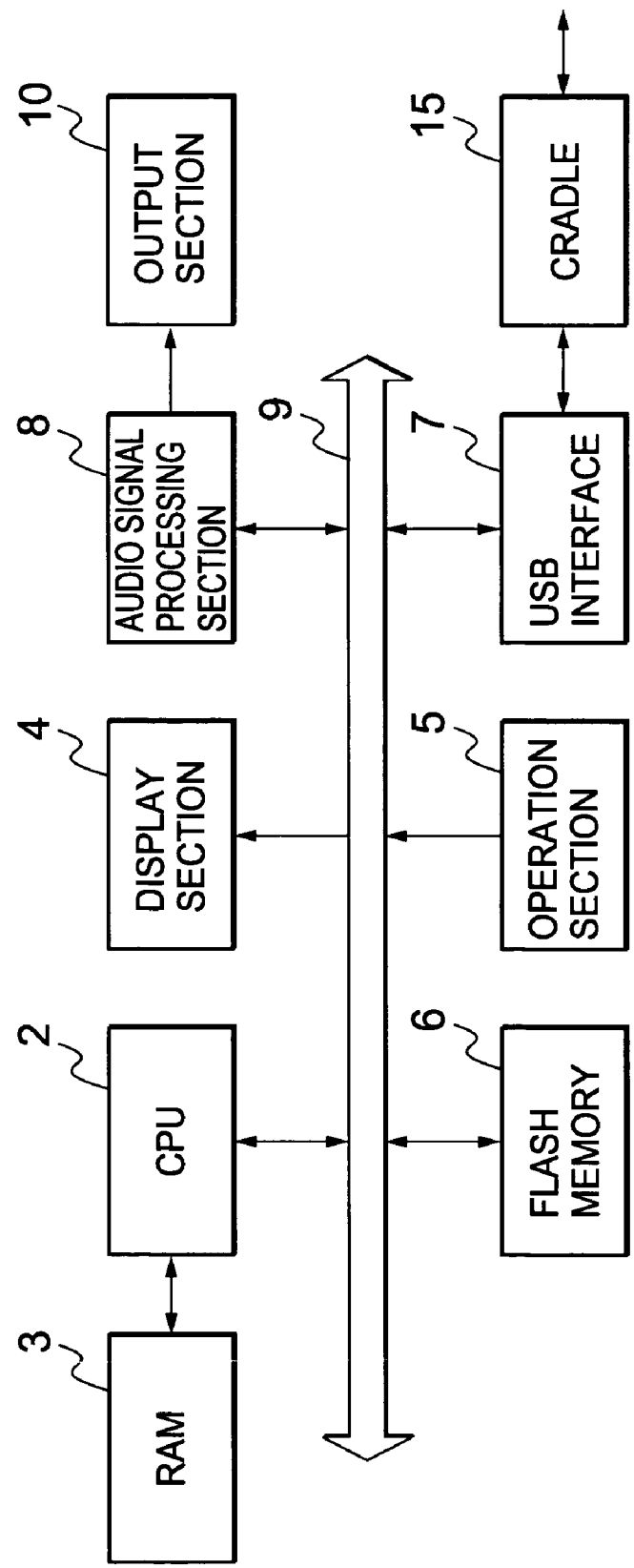
FIG. 1 is a block diagram showing the circuit configuration of a portable digital player related to the present invention.

In FIG. 1, there is shown a portable digital player 1. RAM (Random Access Memory) 3, which is used as a work area, is connected to a CPU (Central Processing Unit) 2, and the portable digital player 1 as a whole is controlled by having a base program and various application programs opened and run on the RAM 3.

In addition, in the portable digital player 1, the CPU 2 is connected to, via a bus 9, a display section 4, comprised of a liquid crystal display for example, for displaying various information such as operation modes, including PLAY, REV, REC and the like, the track number, playback time, remaining battery and so forth, an operation section 5 from which various commands from a user can be inputted, NAND flash memory (hereinafter referred to as flash memory) 6 as a storage medium for storing audio data as content, a USB (Universal Serial Bus) 7 for handling audio data with an external personal computer (not shown) via a cradle 15, and an audio signal processing section 8.

In the portable digital player 1, an output section 10 including, for example, speakers, headphones or the like is connected to the audio signal processing section 8, and audio signals obtained by demodulating audio data read from the flash memory 6 are played via the output section 10.

In addition, by having the portable digital player 1 mounted on the cradle 15 that is connected to a personal computer, its battery (not shown) may be recharged via the cradle 15 and the USB interface 7.

<Playback Control of Portable Digital Player>

The portable digital player 1 uses the FAT file system for managing files as is conventional, ans stores audio data as files in the flash memory 6. In other words, the CPU 2 of the portable digital player 1 records link information of the clusters constituting the files stored in the flash memory 6 in the FAT within the flash memory 6.

Once the CPU 2 receives from the operation section 5 a normal PLAY command for playing an audio file in the forward temporal direction, the CPU 2, based on a FAT serving as a link information table, reads the clusters of the audio file stored in the flash memory 6 sequentially beginning with the first cluster and supplies them to the audio signal processing section 8. The audio signal processing section 8 demodulates the clusters of the audio file that are supplied sequentially to generate audio signals, and plays the audio file via the output section 10.

Figure 2:
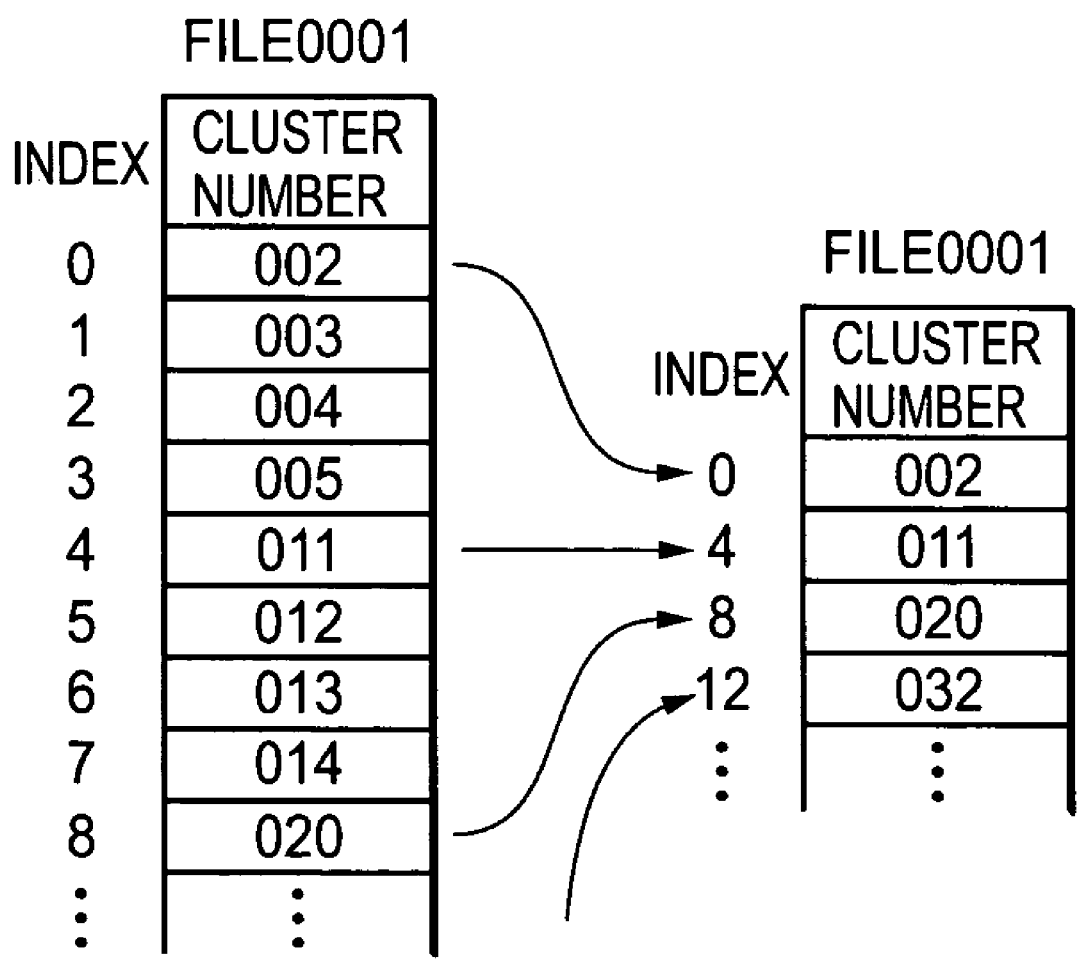
FIGS. 2A and 2B are schematic diagrams illustrating a conventional cluster chain buffer and a cluster chain buffer related to the present invention, accordingly.

In a portable digital player 1 related to the present invention, in addition to the configuration described above, cluster chain buffers for each file stored in the flash memory 6 are recorded in the RAM 3. As opposed to a conventional cluster chain buffer (see FIG. 2A), which records the cluster number of all the clusters constituting a file, a cluster chain buffer as a cluster table related to the present invention (see FIG. 2B) records the cluster number of the clusters constituting a file by skipping clusters based on a predetermined recording interval s (in this case, the recording interval $s=2^2$=once every 4 clusters).

Thus, the space required by a cluster chain buffer related to the present invention becomes 1/s of a conventional cluster chain buffer (that is, as much as 1/s of the FAT), and the memory occupied by the cluster chain buffer can be reduced.

Once the CPU 2 receives from the operation section 5 a REV play command for playing an audio file in the backward temporal direction, the CPU 2 follows a reverse cluster access control process which will be described later, and based on a cluster chain buffer and a FAT, reads the clusters of the audio file stored in the flash memory 6 by accessing them in reverse sequentially beginning with the last cluster and supplies them to the audio signal processing section 8. The audio signal processing section 8 demodulates the clusters of the audio file that are supplied sequentially to generate audio signals, and plays the audio file in reverse via the output section 10.

<Reverse Cluster Access Control Process>

Next, a reverse cluster access control process related to the present invention will be described in detail using FIGS. 3 and 4.

Figure 3:
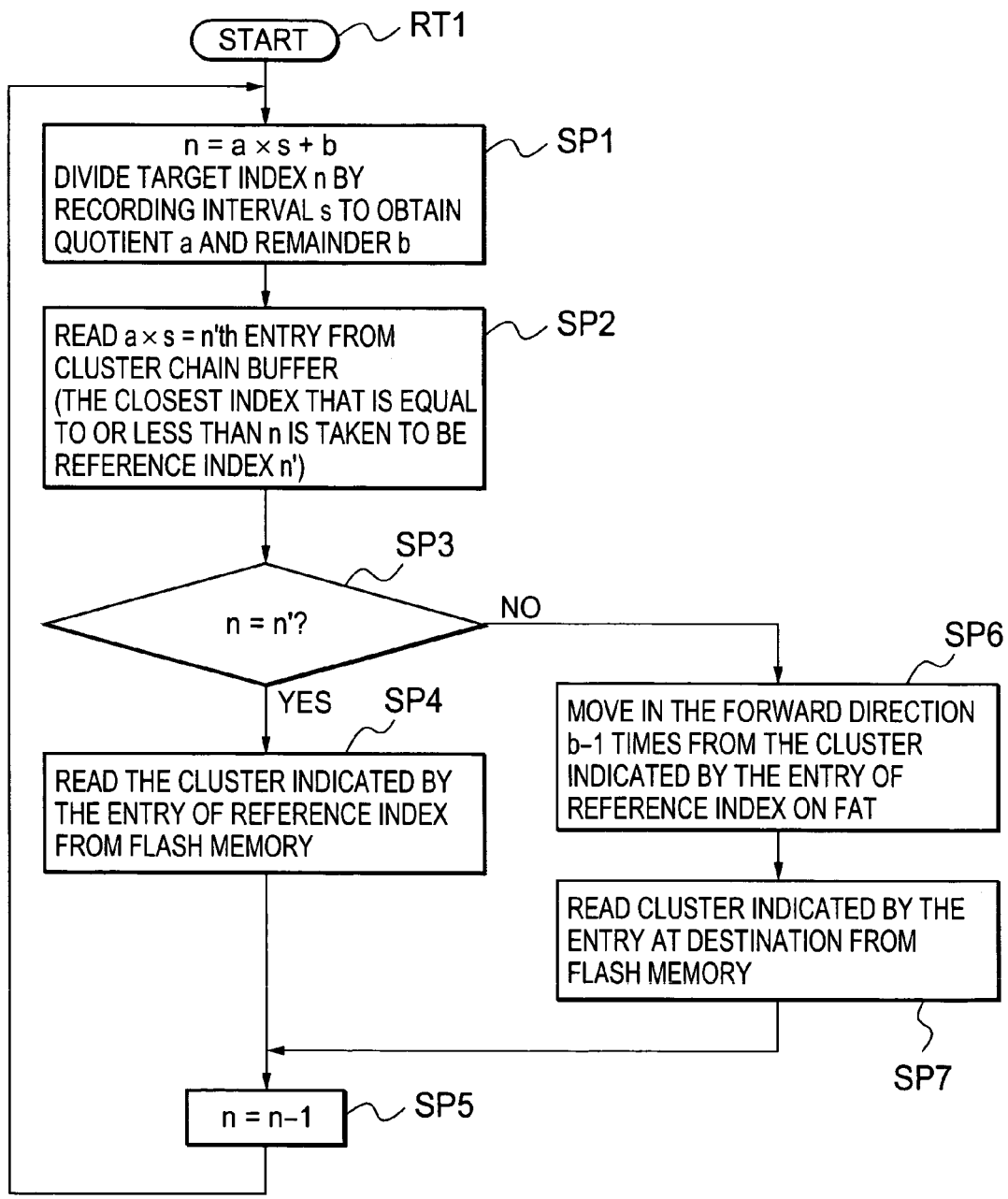
FIG. 3 is a flowchart illustrating reverse cluster access control processing.

Once the CPU 2 as playback means receives from the operation section 5 a REV playback command for playing an audio file in the backward temporal direction, the CPU 2 enters the reverse cluster access control process shown in FIG. 3 from step RT1, and proceeds to step SP1.

In step SP1, the CPU2 divides the index of the cluster it is trying to access (this index will be referred to as target index n) by recording interval s of the cluster chain buffer to calculate quotient a and remainder b (in other words, n=a× s+b), and proceeds to step SP2.

In step SP2, the CPU 2 sets, of the indices recorded in the cluster chain buffer, the closest index that is equal to or smaller than target index n (that is, the index closest to target index n in such a direction) as reference index n' (i.e., n'=a×s), reads the entry for this reference index n' and proceeds to step SP3.

In step SP3, the CPU 3 compares target index n and reference index n'.

In step SP3, if target index n and reference index n' coincide (that is, if remainder b=0), this represents the fact that target index n is recorded in the cluster chain buffer, and in such a case, the CPU 2 proceeds to step SP4.

In step SP4, the CPU 2 reads from the flash memory 6 (see FIG. 1) the cluster indicated by the entry for reference index n' in the cluster chain buffer, supplies it to the audio signal processing section 8 serving as playback means, and proceeds to step SP5. In step SP5, the CPU 2 decrements target index n by 1, and returns to step SP1 to repeat the process above.

On the contrary, if, in step SP3, target index n and reference index n' do not coincide (remainder b≠0), this represents the fact that target index n is not recorded in the cluster chain buffer, in which case the CPU 2 proceeds to step SP6, and obtains the cluster number for target index n by tracing the FAT.

In other words, in step SP6, the CPU 2 moves along the FAT in the forward direction by b−1 times beginning with the cluster indicated by the entry for reference index n'. The cluster number of the link destination indicated by the entry for the cluster thus reached corresponds to the cluster number of target index n.

For example, as shown in FIG. 4A, if target index n32 and recording interval s=4 then quotient a=1, remainder b=3 and reference index n'=4. Therefore, the CPU 2 references the index "4" in the cluster chain buffer (FIG. 4A) as reference index n'. In such a case, since the cluster number indicated by the entry of the index "4" is "011", by moving along the FAT from cluster "11" in the FAT (FIG. 4B) in the forward direction b−1 times (i.e., 2 times), the cluster number "14" recorded in the entry for the reached cluster "013" can be obtained. The cluster number thus obtained is the same as the cluster number recorded with the index "7" indicated in the conventional cluster chain buffer (FIG. 4C).

In step SP7, the CPU 2 reads from the flash memory 6 the cluster indicated by the entry thus reached and supplies it to the audio signal processing section 8, and proceeds to step SP 5. In step SP5, the CPU 2 decrements target index n by 1 and returns to step SP1.

<Operation and Effect>

With the configuration described above, the portable digital player 1 records in the FAT the cluster link structure in the flash memory 6, while at the same time recording in the cluster chain buffer, at predetermined intervals by skipping clusters, the clusters constituting each of the files stored in the flash memory 6 in the order of their indices, which are numbers assigned in the order they are arranged.

When playing the audio file stored in the flash memory 6 in reverse, the CPU 2 of the portable digital player 1 references the FAT and the cluster chain buffer and carries out reverse cluster access in which clusters are read backwards in relation to their indices from the flash memory 6, thereby achieving reverse playback of an audio file.

In performing such reverse cluster access, the CPU 2 divides target index n by recording interval s of the cluster chain buffer to calculate quotient a and remainder b. The CPU 2 references the cluster chain buffer, and if target index n, which the CPU 2 is trying to access, is recorded in the cluster chain buffer, the cluster indicated by the entry for target index n is read from the flash memory 6.

On the other hand, if target index n is not recorded in the cluster chain buffer, the CPU 2 sets, of the indices recorded in the cluster chain buffer, the index closest to target index n while being smaller as reference index n'(n'=a×s). Then, the CPU 2 moves along the FAT b−1 times in the forward direction starting from the cluster indicated by the entry for reference index n', and reads from the flash memory 6 the linked cluster indicated by the entry thus reached.

By recording in the cluster chain buffer at predetermined intervals, and finding cluster numbers by tracing the FAT from the index closest to the target index in finding the cluster number of clusters that are skipped in the cluster chain buffer, the cluster numbers to be recorded in the cluster chain buffer can be reduced, and the capacity of the cluster chain buffer can thus be reduced.

With the configuration described above, by performing reverse cluster access using, in conjunction, the cluster chain buffer in which the cluster numbers of clusters constituting a file are recorded at predetermined intervals and the FAT which records the link structure of the clusters, reverse playback can be carried out rapidly using the cluster chain buffer and the FAT in conjunction while at the same time reducing the capacity of the cluster chain buffer as compared to conventional cluster chain buffers.

<Alternate Embodiments>

In the embodiment above, recording interval s of the cluster chain buffer was taken to be S=4, but the present invention is not limited thereto, and recording interval s may be set to other values as well. By increasing the value of recording interval s, the capacity of the cluster chain buffer may be reduced further, but the number of times the CPU 2 would have to move along the FAT increases, and consequently, the time required for access would increase. For this reason, it is preferable that recording interval s be set to an appropriate value taking into consideration both the capacity of the cluster chain buffer as well as access time. In addition, taking into consideration the processing time required for the division of target index n, it is preferable that recording interval s be a power of 2.

In the embodiment above, a case where the flash memory 6 is used as a storage medium was described, however, the present invention is not limited thereto, and various storage media that employ the FAT file system, such as a hard disk and the like, may also be used.

Further, in the embodiment above, a case where the present invention is applied to the portable digital player 1 for storing and playing, as files, audio data as content data is described, but the present invention is not limited thereto, and the present invention may also be applied to a digital player for storing and playing image data.

Further, in the embodiment above, a case where the present invention is applied to the portable digital player 1 as an electronic device is described, but the present invention is not limited thereto, and the present invention may also be applied to various other electronic devices such as personal computers, PDAs (Personal Digital Assistants) and the like.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

In step SP7, the CPU 2 reads from the flash memory 6 the cluster indicated by the entry thus reached and supplies it to the audio signal processing section 8, and proceeds to step SP 5. In step SP5, the CPU 2 decrements target index n by 1 and returns to step SP1.

What is claimed is:

1. An electronic device, which is adapted to use a storage medium in which content data is divided into units of clusters and stored, comprising:

playback means for reading and playing in units of said clusters, said content data stored in said storage medium;

a link information table in which a link structure of said clusters in said storage medium is recorded, a cluster table in which, of said units of clusters constituting said content data recorded in said storage medium, cluster numbers of said units of clusters played by said playback means are recorded at predetermined recording intervals, wherein when said playback means plays accesses said content data in reverse, if the cluster number of a target cluster to be read is recorded in said cluster table, said target cluster recorded in said cluster table, and indicated by said cluster number, is read from said storage medium, and if said cluster number of said target cluster to be read is not recorded in said cluster table, said cluster number of said target cluster is obtained by moving along said link information table from, said cluster number of said clusters and said recording intervals recorded in said cluster table, a cluster previous to said target cluster, and the cluster indicated by said cluster number thus obtained is read from said storage medium.

2. A playback control method for an electronics device that divides content data into units of clusters, stores said content data on a storage medium, and reads said content data in units of said clusters to play said content data back, said method comprising, in a case where said content data is accessed in reverse:

a judgment step of judging whether or not a cluster number of a target cluster to be read is recorded in a cluster table that records, of a series of said clusters constituting said content data recorded on said storage medium, cluster numbers of said clusters, wherein said content data is read in units of said clusters at predetermined recording intervals;

a first reading step of reading, from said storage medium, a cluster indicated by said cluster number of said target cluster recorded in said cluster table, if said cluster number of said target cluster is recorded in said cluster table, and a second reading step where, if said cluster number of said target cluster is not recorded in said cluster table, a link information table, which records a link structure of said clusters in said storage medium, is traced from said cluster number of said cluster and said recording intervals, of the clusters recorded in said cluster table, previous to said target cluster to obtain said cluster number of said target cluster, and the cluster indicated by said obtained cluster number is read from said storage medium.

* * * * *

UNITED STATES PATENT AND TRADEMARK OFFICE
CERTIFICATE OF CORRECTION

| | | |
|---|---|---|
| PATENT NO. | : 7,155,596 B2 | Page 1 of 1 |
| APPLICATION NO. | : 10/773478 | |
| DATED | : December 26, 2006 | |
| INVENTOR(S) | : Ohbayashi et al. | |

It is certified that error appears in the above-identified patent and that said Letters Patent is hereby corrected as shown below:

In claim 1, column 6, line 59, "means plays accesses" should read --means accesses--.

In claim 2, column 8, line 5, "table, and" should read --table; and--.

Signed and Sealed this

Third Day of April, 2007

JON W. DUDAS
*Director of the United States Patent and Trademark Office*